(12) United States Patent
Lee et al.

(10) Patent No.: US 8,189,427 B2
(45) Date of Patent: May 29, 2012

(54) CLUTTER SIGNAL FILTERING FOR DOPPLER SIGNAL

(75) Inventors: Kwang Ju Lee, Seoul (KR); Jong Sik Kim, Seoul (KR)

(73) Assignee: Medison Co., Ltd., Kangwon-Do (KR)

( * ) Notice: Subject to any disclaimer, the term of this patent is extended or adjusted under 35 U.S.C. 154(b) by 241 days.

(21) Appl. No.: 12/637,652

(22) Filed: Dec. 14, 2009

(65) Prior Publication Data
US 2010/0149920 A1    Jun. 17, 2010

(30) Foreign Application Priority Data

Dec. 17, 2008 (KR) .................. 10-2008-0128861

(51) Int. Cl.
*G01S 15/00* (2006.01)
*G03B 42/06* (2006.01)
(52) U.S. Cl. ........................................... 367/87; 367/11
(58) Field of Classification Search ............ 367/11, 367/87
See application file for complete search history.

(56) References Cited

U.S. PATENT DOCUMENTS

| | | | |
|---|---|---|---|
| 5,501,224 A * | 3/1996 | Shiki .......................... | 600/456 |
| 6,402,694 B1 * | 6/2002 | Bae et al. ................... | 600/453 |
| 7,933,439 B2 * | 4/2011 | Dong .......................... | 382/130 |
| 2002/0006163 A1 * | 1/2002 | Hibi et al. ................ | 375/240.16 |
| 2003/0001778 A1 * | 1/2003 | Benner et al. ................. | 342/451 |
| 2003/0069505 A1 * | 4/2003 | Hager et al. ................. | 600/454 |
| 2003/0176787 A1 * | 9/2003 | Gilbert et al. ................ | 600/437 |
| 2004/0199078 A1 * | 10/2004 | Mo et al. ....................... | 600/437 |
| 2007/0016046 A1 * | 1/2007 | Mozayeni et al. ............ | 600/443 |
| 2007/0160122 A1 * | 7/2007 | Yoshida ....................... | 375/219 |
| 2007/0182279 A1 * | 8/2007 | Kawano et al. ........... | 310/313 R |
| 2008/0287799 A1 * | 11/2008 | Hall et al. .................... | 600/454 |
| 2009/0212933 A1 * | 8/2009 | Salazar ........................ | 340/457 |

FOREIGN PATENT DOCUMENTS

JP    2001-137243    5/2001

* cited by examiner

*Primary Examiner* — James Hulka
(74) *Attorney, Agent, or Firm* — McDermott Will & Emery LLP

(57) ABSTRACT

Embodiments for filtering clutter signal from Doppler signal in an ultrasound system are disclosed. In one embodiment, a Doppler signal acquiring unit may transmit and receive ultrasound signals to and from a target object to acquire Doppler signal. A signal processing unit performs filtering upon the Doppler signal by using a first clutter filter having a first cutoff frequency and compute an input signal power to filtered input signal power rate (IFR) for the Doppler signal. The signal processing unit is further configured to be responsive to the IFR to modulate the Doppler signal and perform filtering upon the modulated Doppler signal by using the first clutter filter or to perform filtering the Doppler signal by using a second clutter filter having a second cutoff frequency.

13 Claims, 6 Drawing Sheets

CLUTTER SIGNAL FILTERING FOR DOPPLER SIGNAL

CROSS-REFERENCE TO RELATED APPLICATIONS

The present application claims priority from Korean Patent Application No. 10-2008-0128861 filed on Dec. 17, 2008, the entire subject matter of which is incorporated herein by reference.

TECHNICAL FIELD

The present disclosure relates to ultrasound signal processing, and more particularly to clutter signal filtering for Doppler signal in an ultrasound system.

BACKGROUND

Recently, an ultrasound system has been extensively used in the medical field due to its non-invasive and non-destructive nature. Modern high-performance ultrasound imaging diagnostic systems and techniques are commonly used to produce two- or three-dimensional ultrasound images of internal features of patients. In order to provide the ultrasound images, the ultrasound system operates in various image modes such as a brightness mode, a Doppler mode and the like to acquire ultrasound images for diagnosis.

In the Doppler mode, the ultrasound system provides a color flow image showing velocities of moving objects such as blood flow, heart, etc. The color flow image may be formed based on a Doppler signal obtained by alternately transmitting and receiving ultrasound signals to and from a target object. The Doppler signal may include a low frequency signal (the so-called clutter signal) due to the motion of a cardiac wall or valve of a heart. The clutter signal may have amplitude, which is over 100 times than that of a pure Doppler signal indicative of velocities of the blood flow. The clutter signal may be an obstacle to accurately detect a velocity of the blood flow. Thus, it is required to remove the clutter signal from the Doppler signal for accurate velocity detection of the blood flow. The ultrasound system typically adopts a clutter filter, which may be a high pass filter, to remove the clutter signal from the Doppler signal.

Recently, two clutter filtering methods have been adopted to remove the clutter signal from the Doppler signal. One is a clutter filtering method using a clutter power threshold. The other is a clutter filtering method using variance information of the clutter signal.

The clutter filtering method using the clutter power threshold may be carried out by modulating the Doppler signal when the amplitude of the Doppler signal is greater than the clutter power threshold. Thereafter, the modulated Doppler signal may be filtered by using a clutter filter having a predetermined cutoff frequency. In such a method, however, if the amplitude of the Doppler signal is less than the clutter power threshold, then the modulation may not be performed. Also, when the power level of the pure Doppler signal is close to that of the clutter signal, the modulation may not be desirably performed. Thus, the clutter signal may not be effectively removed from the Doppler signal.

The clutter filtering method using the variance information of clutter signal may be carried out by changing a cutoff frequency of a clutter filter. The clutter filter adopted in the conventional ultrasound system may remove the clutter signal in the Doppler signal by suppressing the frequency components thereof below a specific cutoff frequency. In such a case, however, if the cutoff frequency is set to a high value, then relatively low frequencies of the pure Doppler signal may be also cut off along with the clutter signal. Thus, it may be difficult to accurately detect the velocities of the blood flow.

SUMMARY

Embodiments for setting cutoff frequencies of clutter filters based on power and mean frequency of clutter signal are disclosed herein. In one embodiment, by way of non-limiting example, an ultrasound system includes: a Doppler signal acquiring unit configured to transmit and receive ultrasound signals to and from a target object to acquire Doppler signal; and a signal processing unit configured to perform filtering upon the Doppler signal by using a first clutter filter having a first cutoff frequency and compute an input signal power to filtered input signal power rate (IFR) for the Doppler signal, the signal processing unit being further configured to be responsive to the IFR to modulate the Doppler signal and perform filtering upon the modulated Doppler signal by using the first clutter filter or to perform filtering the Doppler signal by using a second clutter filter having a second cutoff frequency.

In another embodiment, a method of filtering clutter signal from Doppler signal comprises: a) transmitting and receiving ultrasound signals to and from a target object to acquire Doppler signal; b) filtering the Doppler signal by using a first clutter filter having a first cutoff frequency and computing an input signal power to filtered input signal power rate (IFR) for the Doppler signal; and c) modulating the Doppler signal and performing filtering upon the modulated Doppler signal by using the first clutter filter or performing filtering the Doppler signal by using a second clutter filter having a second cutoff frequency in response to the IFR.

The Summary is provided to introduce a selection of concepts in a simplified form that are further described below in the Detailed Description. This Summary is not intended to identify key or essential features of the claimed subject matter, nor is it intended to be used in determining the scope of the claimed subject matter.

DETAILED DESCRIPTION

A detailed description may be provided with reference to the accompanying drawings. One of ordinary skill in the art may realize that the following description is illustrative only and is not in any way limiting. Other embodiments of the present invention may readily suggest themselves to such skilled persons having the benefit of this disclosure.

Figure 1:
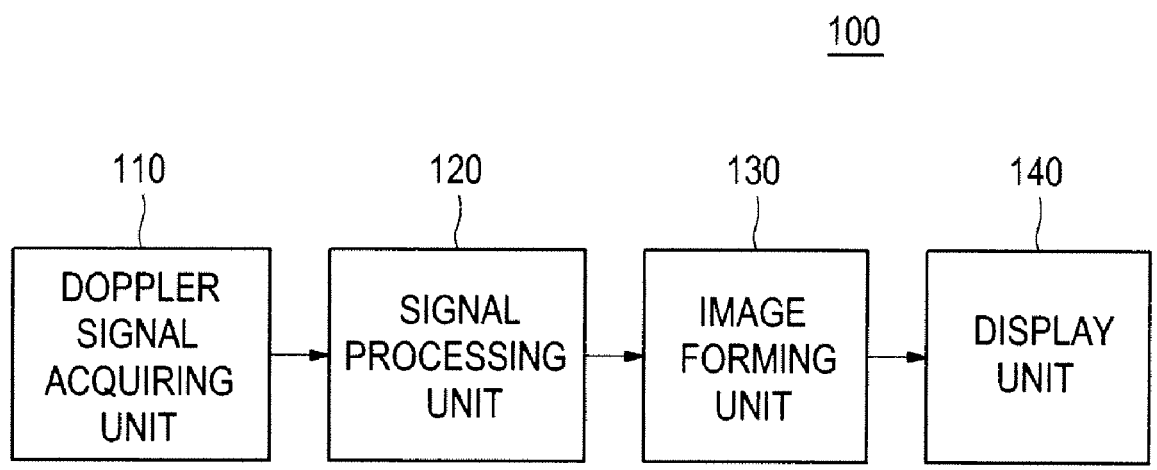
FIG. 1 is a block diagram showing an illustrative embodiment of an ultrasound system.

Referring to FIG. 1, an illustrative embodiment of an ultrasound system 100 is shown. As depicted therein, the ultrasound system 100 may include a Doppler signal acquisition unit 110. The Doppler signal acquisition unit 110 may be operable to alternately transmit and receive ultrasound signals to and from a target object (e.g., heart, blood flow, etc) in synchronization with a pulse repetition frequency (PRF) to thereby acquire a Doppler signal. The Doppler signal may include a clutter signal due to the motion of cardiac walls or valves of a heart together with a pure Doppler signal indicating velocities of a blood flow. In one embodiment, the Doppler signal acquisition unit 110 may include a transmit signal generator (not shown) configured to generate transmit pulse signals. The Doppler signal acquisition unit 110 may further include an ultrasound probe (not shown) that may be operable to transmit ultrasound signals to the target object in response to the transmit pulse signals and receive ultrasound echo signals reflected from the target object to thereby output an electrical receive signal. The Doppler signal acquisition unit 110 may further include a beam former (not shown), which may be operable to perform receive-focusing upon the electrical receive signal to obtain a receive-focused signal. The Doppler signal acquisition unit 110 may further include a Doppler signal forming section (not shown) that may be operable to sample the receive-focused signal at a predetermined sampling frequency and perform signal processing upon the sampled signal to acquire the Doppler signal.

The ultrasound system 100 may further include a signal processing unit 120. The signal processing unit 120 may be operable to analyze characteristics of the Doppler signal such as a mean power, mean velocity, variance, etc. thereof to determine whether to modulate the Doppler signal or change a cutoff frequency of a clutter filter necessary for clutter signal removal from the Doppler signal. The signal processing unit 120 may be further operable to perform auto correlation, arc tangent operation, etc. upon the Doppler signal.

Figure 2:
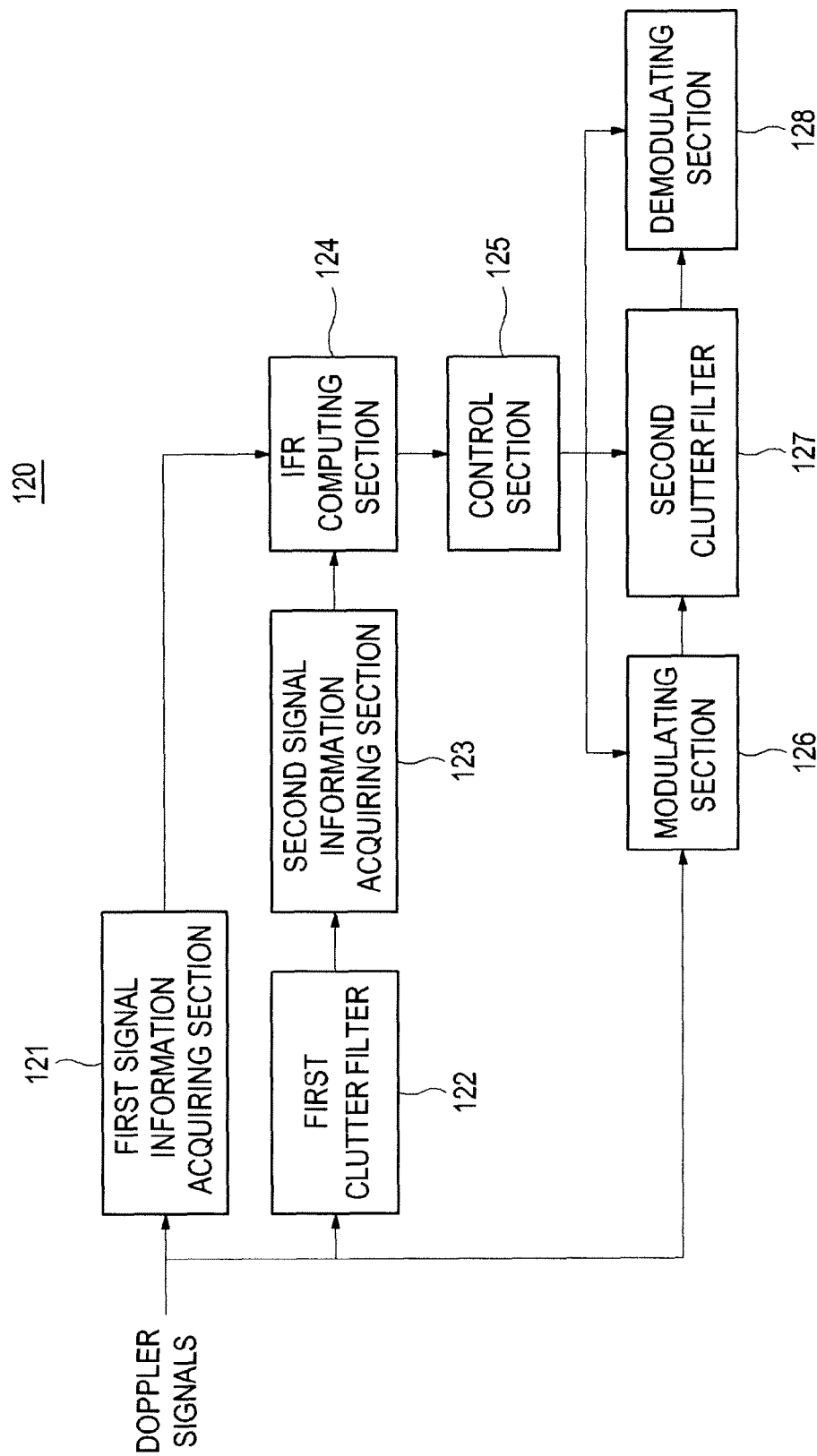
FIG. 2 is a block diagram showing an illustrative embodiment of a signal processing unit.

FIG. 2 is a block diagram showing an illustrative embodiment of the signal processing unit 120. As shown in FIG. 2, the signal processing unit 120 may include a first signal information forming section 121. The first signal information forming section 121 may be operable to analyze the characteristics of the Doppler signal provided form the Doppler signal acquisition unit 110 to form first signal information. In one embodiment, by way of non-limiting example, the first signal information may include a mean power, a mean velocity, a variance, etc. of the Doppler signal. The mean power P, the mean velocity V and the variance a may be computed by the following equations.

$$P = R[0] = \frac{1}{N} \sum_{n=0}^{N-1} x[n]x[n]^* \quad (1)$$

$$R[1] = \frac{1}{N-1} \sum_{n=0}^{N-2} x[n]^* x[n+1]$$

$$V = V_{max} \tan^{-1}(\operatorname{Im}(R[1])/\operatorname{Re}(R[1]))/\pi$$

-continued $$\sigma^2 = 1 - \frac{|R[1]|}{R[0]}$$

wherein R[0] and R[1] represent values resulting from the auto-correlation upon the Doppler signal.

The signal processing unit 120 may further include a first clutter filter 122 coupled to the Doppler signal acquisition unit 110 to receive the Doppler signal. The first clutter filter 122 may be operable to perform filtering upon the Doppler signal to remove the clutter signal therefrom. In one embodiment, the first clutter filter 122 may use a cutoff frequency to be set within about 10% from a half of the predetermined sampling frequency used to sample the receive-focused signal for acquiring the Doppler signal.

The signal processing unit 120 may further include a second signal information forming section 123 coupled to the first clutter filter 122 to receive the filtered Doppler signal. The second signal information forming section 123 may be operable to analyze the filtered Doppler signal to form second signal information. The second signal information may include a mean power, a mean velocity, variance, etc. of the filtered Doppler signal. The mean power, mean velocity and variance may be also computed by the above equations (1).

The signal processing unit 120 may further include an input signal power to filtered input signal power rate (IFR) computing section 124 coupled to the first and second signal information forming sections 121 and 123 to receive the first and second signal information. The IFR computing section 124 may be operable to compute the IFR by using mean powers included in the first and second signal information by using the following equation.

$$IFR = -20 \times \log_{10}\left(\frac{P_2}{P_1}\right) \quad (2)$$

wherein $P_1$ represents the mean power of the first signal information and $P_2$ represents the mean power of the second signal information.

Figure 3:
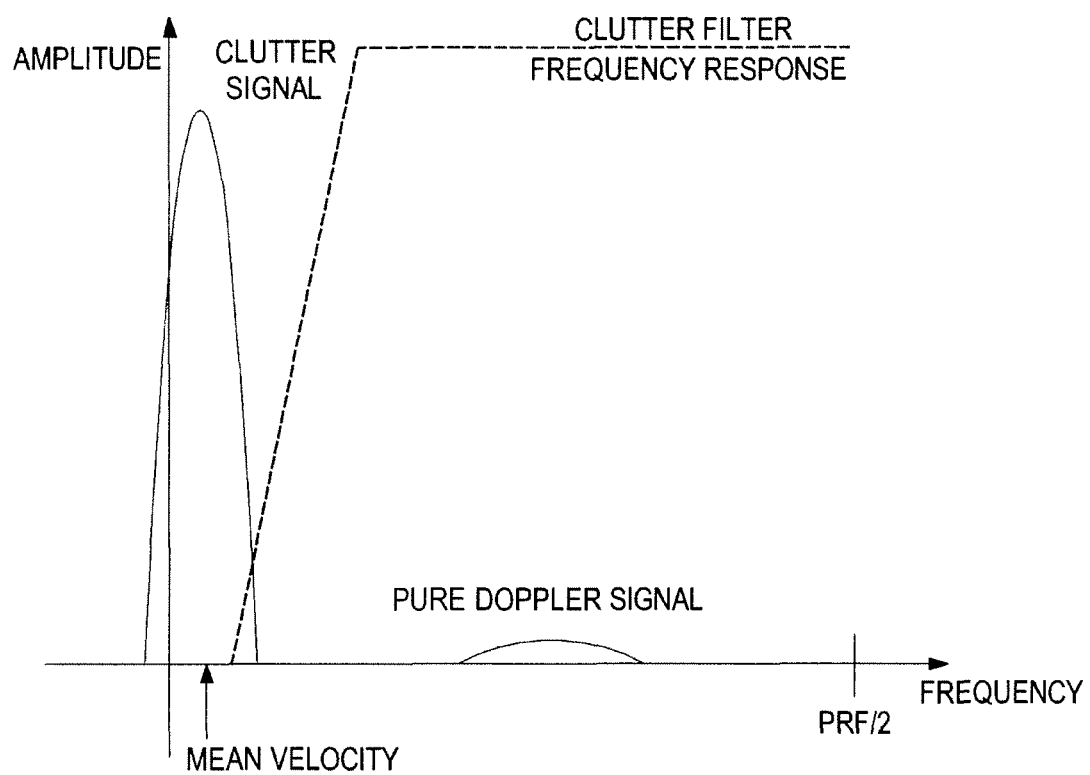
FIG. 3 is a diagram showing an illustrative embodiment of a frequency spectrum of a Doppler signal containing a clutter signal and a frequency response of a clutter filter, wherein a mean frequency of the Doppler signal is lower than a half pulse repetition frequency, and wherein the frequency representative of a mean velocity is relatively low.
Figure 5:
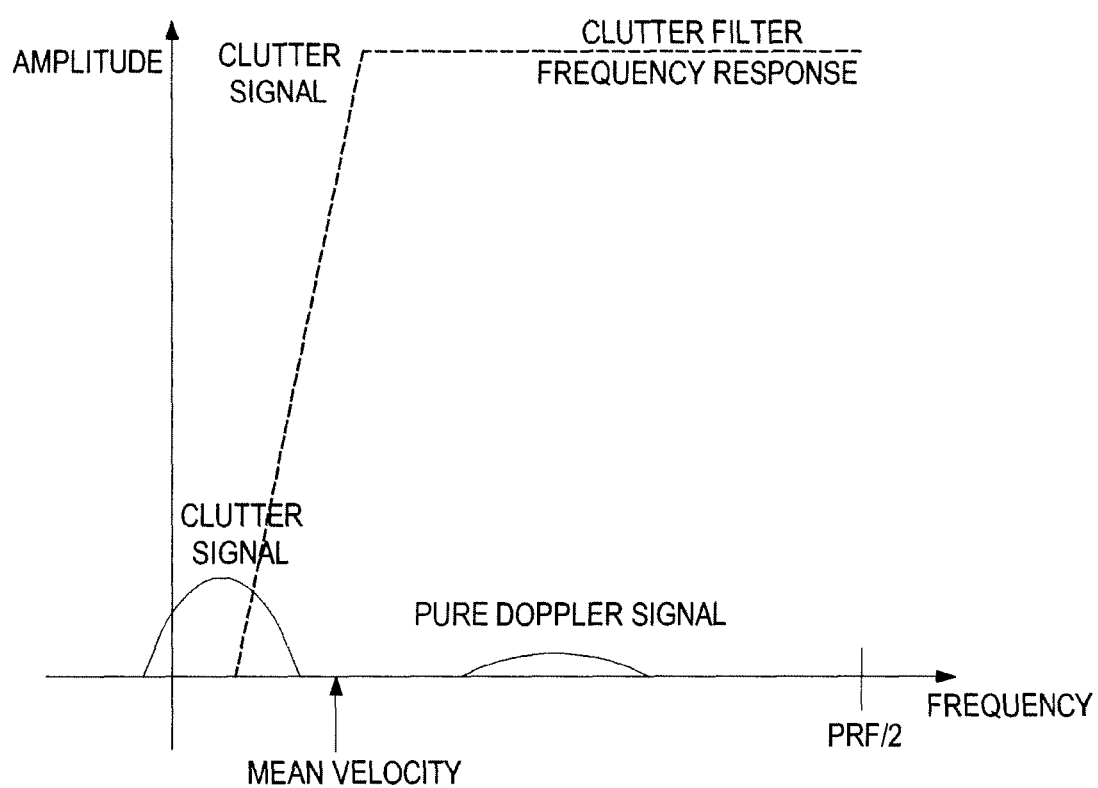
FIG. 5 is a diagram showing an illustrative embodiment of a frequency spectrum of a Doppler signal containing a clutter signal and a frequency response of a clutter filter, wherein a mean power of the clutter signal is close to that of the pure Doppler signal.

The signal processing unit 120 may further include a control section 125 coupled to the IFR computing section 124. The control section 125 may be operable to compare the IFR with a predetermined threshold. When the Doppler signal having relatively high power exists in a low frequency region lower than PRF/2 on a frequency domain and a mean frequency representative of a mean velocity thereof is relatively low, as shown FIG. 3, the IFR may be typically greater than 20. Thus, for example, 20 may be set as the predetermined threshold. If the IFR is greater than the predetermined threshold (e.g., 20), then the control section 125 may be operable to generate a first control signal. On the other hand, when the mean power of the clutter signal is close to that of the pure Doppler signal, the mean frequency representative of the mean velocity of the Doppler signal may be positioned at the middle of the Doppler signal, as illustrated in FIG. 5. In such a case, the IFR may be a value ranging from 5 to 20. Since the mean velocity of the Doppler signal is largely different from the mean velocity of the clutter signal, the clutter signal may not be effectively removed through the clutter filtering method using a clutter power threshold. Thus, when the IFR is less than the predetermined threshold, the control section 125 may be operable to generate a second control signal.

Figure 4:
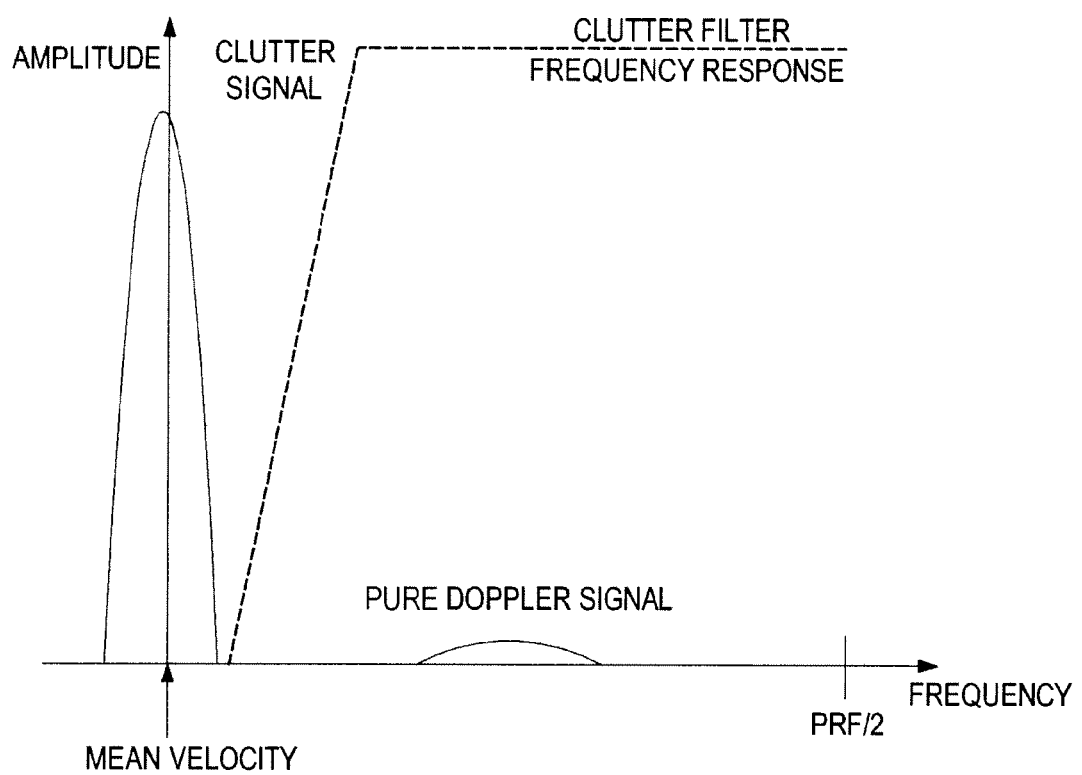
FIG. 4 is a diagram showing an illustrative embodiment of a frequency spectrum of a modulated Doppler signal containing a modulated clutter signal and a frequency response of a clutter filter.

The signal processing unit 120 may further include a modulating section 126 that may operate under the control of the control section 125. The modulating section 126 may be operable to set a predetermined modulation frequency in response to the first control signal and modulate the Doppler signal based on the predetermined modulation frequency to thereby output a modulated Doppler signal, as illustrated in FIG. 4. The modulating section 126 may be further operable to set the modulation frequency to zero in response to the second control signal. That is, if the second control signal is received from the control section 125, then the modulating section 126 may not modulate the Doppler signal.

Figure 6:
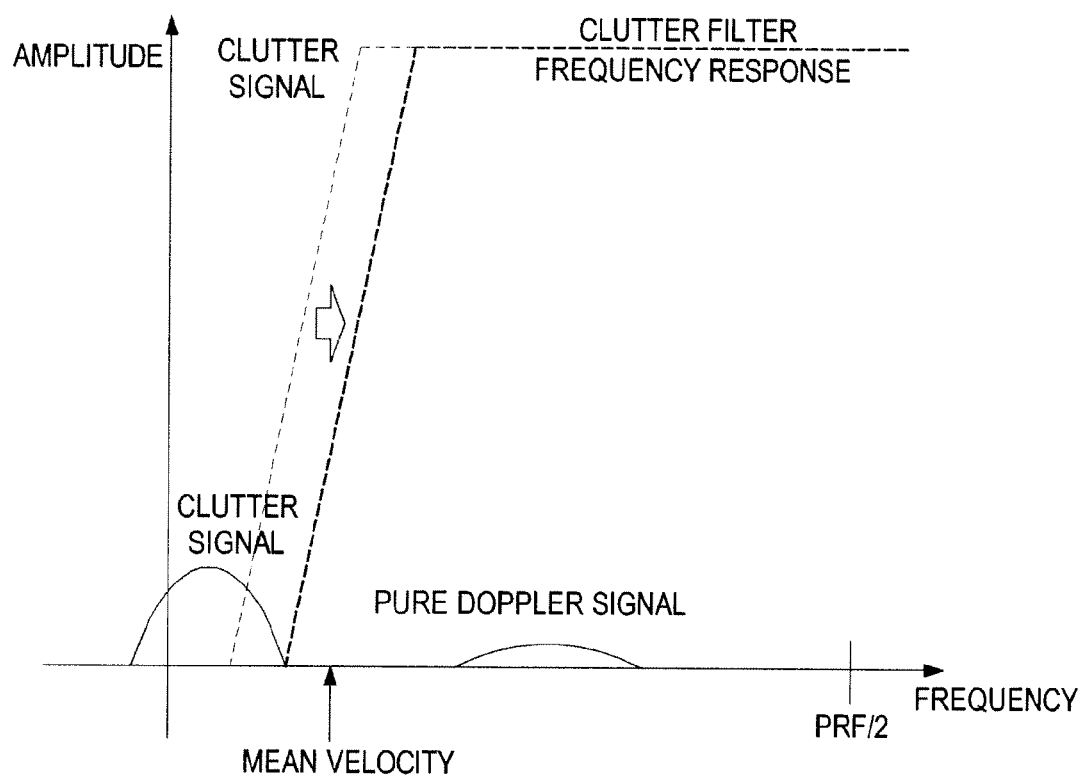
FIG. 6 is a diagram showing an illustrative embodiment of a frequency spectrum of a Doppler signal containing a clutter signal and adjustment of a frequency response of a clutter filter.

The signal processing unit 120 may further include a second clutter filter 127 that may operate under the control of the control section 125. The second clutter filter 127 may be operable to perform filtering upon the modulated Doppler signal to remove the clutter signal therefrom by using a cutoff frequency, which is identical to that used in the first clutter filter 122, in response to the first control signal. That is, the cutoff frequency may be set to be within about 10% from a half of a sampling frequency used to sample the receive-focused signal for acquiring the Doppler signal. If the second control signal is received from the control section 125, then the second clutter filter 127 may be operable to adjust the cutoff frequency to remove the clutter signal from the Doppler signal, as illustrated in FIG. 6. In such a case, the cutoff frequency may be changed based on a frequency representative of the mean velocity formed by the first signal information forming section 121.

The signal processing unit 120 may further include a demodulating section 128. The demodulating section 128 may be operable to set a demodulation frequency by using a frequency corresponding to the mean velocity formed by the first signal information forming section 121 in response to the first control signal. The demodulating section 128 may be further operable to demodulate the modulated Doppler signal provided from the second clutter filter 127. If the second control signal is received, then the demodulating section 128 may be operable to set the modulation frequency to zero. That is, the demodulating section 128 may not demodulate the Doppler signal outputted from the second clutter filter 127 in response to the second control signal.

Referring back to FIG. 1, the ultrasound system 100 may further include an image forming unit 130. The image forming unit 130 may be operable to form a Doppler image based on the Doppler signal outputted from the signal processing unit. The Doppler image may be displayed on a display unit 140. The display unit 140 may include at least one of CRT display, LCD, plate panel display and the like.

Although embodiments have been described with reference to a number of illustrative embodiments thereof, it should be understood that numerous other modifications and embodiments can be devised by those skilled in the art that will fall within the spirit and scope of the principles of this disclosure. More particularly, numerous variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An ultrasound system, comprising:
a Doppler signal acquiring unit configured to transmit and receive ultrasound signals to and from a target object to acquire a Doppler signal; and
a signal processing unit configured to perform filtering upon the Doppler signal by using a first clutter filter having a first cutoff frequency and compute an input signal power to filtered input signal power rate (IFR) for the Doppler signal, the signal processing unit being further configured to be responsive to the IFR to modulate the Doppler signal and perform filtering upon the modulated Doppler signal by using the first clutter filter or to perform filtering the Doppler signal by using a second clutter filter having a second cutoff frequency.

2. The ultrasound system of claim 1, wherein the signal processing unit includes:
a first signal information acquiring section configured to analyze the Doppler signal to acquire first signal information;
the first clutter filter configured to perform filtering upon the Doppler signal by using the first cutoff frequency to thereby output a first filtered Doppler signal;
a second signal information acquiring section configured to analyze the first filtered Doppler signal to acquire second signal information;
an IFR computing section configured to compute the IFR based on the first and second signal information;
a control section configured to output a first control signal when the IFR is greater than a predetermined threshold and a second control signal when the IFR is less than the predetermined threshold;
a modulating section configured to set a modulation frequency by using the first signal information in response to the first control signal and modulate the Doppler signal by using the modulation frequency, the modulating section being further configured to set a modulation frequency to zero in response to the second control signal;
the second clutter filter configured to perform filtering upon the modulated Doppler signal by using the first cutoff frequency in response to the first control signal, the second clutter filter being further configured to perform filtering upon the Doppler signal by using the second cutoff frequency determined by adjusting the first cutoff frequency based on the first signal information in response to the second control signal; and
a demodulating section configured to set a demodulation frequency based on the first signal information and demodulate the modulated Doppler signal outputted from the second clutter filter, the demodulating section being further configured to set the demodulation frequency to zero in response to the second control signal.

3. The ultrasound system of claim 2, wherein the first signal information includes mean power, mean velocity and variance of the Doppler signal, and wherein the second signal information includes mean power, mean velocity and variance of the filtered Doppler signal.

4. The ultrasound system of claim 3, wherein the IFR is computed by the following equation, $$IFR = -20 \times \log_{10}\left(\frac{P_2}{P_1}\right)$$

wherein $P_1$ represents the mean power of the first signal information and $P_2$ represents the mean power of the second signal information.

5. The ultrasound system of claim 3, wherein the second cutoff frequency corresponds to the mean velocity of the first signal information.

6. A method of filtering clutter signal from Doppler signal, comprising:

a) transmitting and receiving ultrasound signals to and from a target object to acquire Doppler signal;

b) filtering the Doppler signal by using a first clutter filter having a first cutoff frequency and computing an input signal power to filtered input signal power rate (IFR) for the Doppler signal; and c) modulating the Doppler signal and performing filtering upon the modulated Doppler signal by using the first clutter filter or performing filtering the Doppler signal by using a second clutter filter having a second cutoff frequency in response to the IFR.

7. The method of claim 6, wherein the step b) includes:

analyzing the Doppler signal to acquire first signal information;

performing filtering upon the Doppler signal by using the first clutter filter having a first cutoff frequency to thereby output a first filtered Doppler signal;

analyzing the first filtered Doppler signal to acquire second signal information;

computing the IFR based on the first and second signal information.

8. The method of claim 7, wherein the first signal information includes mean power, mean velocity and variance of the Doppler signal, and wherein the second signal information includes mean power, mean velocity and variance of the filtered Doppler signal.

9. The method of claim 8, wherein the IFR is computed by the following equation, $$IFR = -20 \times \log_{10}\left(\frac{P_2}{P_1}\right)$$

wherein $P_1$ represents the mean power of the first signal information and $P_2$ represents the mean power of the second signal information.

10. The method of claim 9, wherein the step c) includes:

comparing the IFR with a predetermined threshold;

outputting a first control signal when the IFR is greater than the predetermined threshold;

setting a modulation frequency by using the first signal information in response to the first control signal; and modulating the Doppler signal by using the modulation frequency.

11. The method of claim 10, further comprising:

setting a demodulation frequency based on the first signal information; and demodulating the filtered modulated Doppler signal.

12. The method of claim 10, wherein the step c) further includes:

outputting a second control signal when the IFR is less than the predetermined threshold; and adjusting the first cutoff frequency by using the first signal information in response to the second control signal.

13. The method of claim 12, wherein the second cutoff frequency corresponds to the mean velocity of the first signal information.

\* \* \* \* \*